United States Patent [19]

Kerherve

[11] Patent Number: 5,037,877

[45] Date of Patent: Aug. 6, 1991

[54] POLYMER BASED PREPARATION FOR THE SURFACE PROTECTION OF ZINC AGAINST WHITE RUST

[75] Inventor: Jean P. Kerherve, Montlhery, France

[73] Assignee: Produits Chimiques Auxiliaires et de Synthese (P.C.A.S.), Longjumeau Cedex, France

[21] Appl. No.: 563,194

[22] Filed: Aug. 6, 1990

Related U.S. Application Data

[62] Division of Ser. No. 257,828, Oct. 14, 1988.

[30] Foreign Application Priority Data

Oct. 22, 1987 [FR] France .............................. 87 14615
Jul. 20, 1988 [FR] France .............................. 88 09818

[51] Int. Cl.$^5$ ............................................ C08L 33/06
[52] U.S. Cl. .................................. 524/560; 524/556; 524/96; 524/833
[58] Field of Search .................. 524/560, 556, 96, 833

[56] References Cited

U.S. PATENT DOCUMENTS

| | | | |
|---|---|---|---|
| 2,958,611 | 11/1990 | Ulrich | 117/75 |
| 4,139,514 | 2/1979 | Bassett | 428/500 X |
| 4,163,739 | 8/1979 | Dalibor | 526/75 X |
| 4,259,219 | 3/1981 | Eschwey et al. | 427/384 X |

FOREIGN PATENT DOCUMENTS 0115694 8/1984 European Pat. Off. .

*Primary Examiner*—Joseph L. Schofer
*Assistant Examiner*—J. M. Reddick
*Attorney, Agent, or Firm*—Sandler, Greenblum & Bernstein

[57] ABSTRACT

A process for producing an acrylic and/or methacrylic polymer based preparation for the surface treatment of zinc consists in polymerizing at least one (meth)acrylic acid and at least one (meth)acrylate in a mixture of organic cosolvents. The preparation is then formed from the resultant copolymer in the cosolvents by dilution in a quantity of water and preferably an excess of water with respect to the cosolvents in the polymerization stage.

26 Claims, No Drawings

POLYMER BASED PREPARATION FOR THE SURFACE PROTECTION OF ZINC AGAINST WHITE RUST

This is a division of application Ser. No. 07/257,828 filed Oct. 14, 1988, the disclosure of which is incorporated herein in its entirety by reference.

BACKGROUND OF THE INVENTION

1. Field of the Invention

The present invention concerns a process for producing a preparation for use in the surface protection of zinc against "white rust" in both solid zinc and zinc-coated articles. The invention encompasses said preparation and a process for the protection, optionally temporary, of zinc against white rust.

2. Description of the Prior Art

Zinc, of course, is a metal which is widely used particularly in the protection of steels against corrosion (galvanization).

In a relatively low humidity atmosphere, zinc carbonate (the "patina") forms on the zinc surface which renders the metal less sensitive to any further atmospheric corrosion. However, in a humid, acidic or warm atmosphere (as is often the case in industrial or tropical storage) zinc carbonate formation is locally replaced by formation of hydrated zinc hydroxide, generally known as "white rust", which modifies the appearance of galvanized objects and corrodes them.

The zinc surface must therefore be protected in order to avoid formation of white rust.

The most successful prior art technique uses sodium dichromate solution, $Na_2Cr_2O_7$, which affords suitable protection but whose use is dangerous due to the toxicity of $Na_2Cr_2O_7$.

Other techniques produce reasonable results as far as protection is concerned, but certain drawbacks (such as greasy or oily films, inflammability, etc) limit their use.

The aim of the invention is to overcome these drawbacks by using a preparation based on acrylic and/or methacrylic polymers.

U.S. Pat. No. 2,958,611 has already envisaged treatment of zinc articles with acrylic polymer-based preparations. However, these preparations are certainly not intended to protect zinc against white rust but to form a priming layer to allow a subsequent layer of paint to adhere to it, covering the components and rendering them unsuitable for their currently envisaged purpose.

Thus the acrylic copolymer described in U.S. Pat. No. 2,958,611 is produced in volatile organic solvents or in aqueous dispersion and requires use of a surfactant or wetting agent (Triton X-200).

An exclusively or essentially organic solution can only be applied at relatively low temperatures compared with those at which articles leave galvanization baths.

Use of a surfactant in a dispersion or emulsion renders it unsuitable for weather protection of zinc.

SUMMARY OF THE INVENTION

According to the invention, a protective preparation is produced by a process consisting of polymerizing at least one (meth)acrylic acid and at least one (meth)acrylate in a mixture of organic cosolvents, then forming a preparation from the resultant copolymer solution in said cosolvents which is ready for use on dilution in a quantity of water, preferably an excess with respect to the cosolvents in the copolymerization stage.

The predominantly aqueous system thus obtained produces a dry, adherent, non toxic film which may be removed if desired and which is usable on hot or cold objects. The film is readily produced (by dipping, spraying, etc) from a homogeneous, non-flammable solution.

In the present description and claims, "(meth)acrylate" means an acrylate or a methacrylate and "(meth)acrylic acid" means acrylic or methacrylic acid.

In practice, the (meth)acrylate is a $C_1$ to $C_{22}$ alkyl (meth)acrylate.

"Copolymer" is broadly defined as a polymer comprising monomeric moieties of at least two types. Preferably the copolymer comprises moieties of two types or of three types, i.e. a terpolymer.

In a particularly preferred embodiment, a preparation according to the invention contains a terpolymer comprising lauryl (meth)acrylate moieties, i.e. comprising a 12 carbon atom alkyl element.

It has been discovered that increasing the molecular weight of at least one of the constituent moieties of the terpolymer produces a composition having particular advantages.

These novel compositions can thus be used to treat hot objects, even those just coming out of the galvanization bath at about 250° C. In addition the useful life of the treatment bath is increased. Further, the adhesion and flexibility of the deposited film is improved.

The methacrylate copolymer will hereinafter be designated the "active component".

The active component has an acid number of 50 to 150 mg KOH per gram of component, preferably 90 to 120 mg KOH per gram.

In addition, the active component preferably has a number average molecular weight $\overline{Mn}$ of between 2 000 and 20 000, preferably between 3 000 and 5 000.

The water added to make the preparation ready for use is in the form of an aqueous amino solution such as an ammonia solution or morpholine based solution.

The quantity of active component in the solution depends on the protection desired and on the application method used but is generally between 1 and 50 g of solids per 100 g preparation.

Usually the protective layer deposited on the zinc is intended to be permanent. It is possible, however, to envisage circumstances where only temporary protection is required and where the zinc must be cleaned of its surface protection, for example prior to painting with a paint which would not adhere to the protective layer.

In such a case, the protective layer can be eliminated by reaction with a weak alkaline detergent.

The base preparation is colorless and transparent. Appropriate ingredients may be added, however, to render the preparation opaque and/or colored.

EXAMPLES

The invention will be better understood from the examples below:

EXAMPLE 1

Composition prepared from methacrylic acid and butyl methacrylate a) Polymer synthesis A triple-necked flask was equipped with a stirrer, thermometer, feed funnel, nitrogen inlet and coolant.

The following solvent mixture was introduced into the triple-necked flask:

| | |
|---|---|
| monoethylene glycol, butyl ether | 215.5 g |
| n-propanol | 207 g |
| 4-methyl-2-pentanol | 50.7 g |

The mixture was brought to 80° C. under agitation.
The following homogeneous mixture was introduced into the feed funnel:

| | |
|---|---|
| methacrylic acid | 77.9 g |
| butyl methacrylate | 416.6 g |
| dodecane thiol | 36.3 g |
| azo-bis-isobutyronitrile | 4.57 g |

The last two components act in known manner as reaction initiator and accelerator.

This mixture was slowly introduced into the flask over a period of 40 to 60 minutes, keeping the temperature of the reaction medium at 83° C. After addition was complete the reaction medium was held at 83° C. for 2½ hours.

The solution obtained contained 50% polymer whose acid number was 95 mg KOH per gram.

b) Production of preparation 250 g of the product solution from the preceding stage was stirred together in a triple-necked flask with 750 g deionized water and about 17 g ammonia solution at 22° C.

A homogeneous solution was obtained having a pH of 9.2, 12.5% dry content and a viscosity, measured using an AFNOR No. 2.5 cup viscometer, of about 50 seconds.

c) Application

The prepared solution may be applied by bath immersion, spraying with or without carrier gas, electrostatic deposition, painting, etc.

Drying speed depends on the application method used. It varied between 15 seconds and 30 minutes.

The film obtained was homogeneous, transparent, colorless, dry and adherent. Its thickness varied between 2 and 20 microns depending on the application method and the zinc porosity. It had good water resistance.

Corrosion tests were carried out on a stack of plates and angle irons kept in the store of a galvanization unit.

The objects, protected by an almost invisible film, still looked dry and only slightly powdery after more than 3 months' storage.

The galvanized zinc showed no evidence of white rust. Under the same conditions an unprotected galvanized object was strongly attacked by white rust.

EXAMPLE 2

Variation of $\overline{Mn}$

The method of example 1 was used, modifying the proportions of the monomer-transfer agent mixture as follows:

| | |
|---|---|
| methacrylic acid | 83 g |
| butyl methacrylate | 416.6 g |
| dodecane thiol | 72 g |
| azo-bis-isobutyronitrile | 4.57 g |

The polymer obtained had an acid number of 95 mg KOH for 1 g and $\overline{Mn}$ of 2 500.

The film obtained from a solution prepared according to the method of example 1 was more flexible than that obtained in example 1 and slightly sticky.

EXAMPLE 3

Variation of acid number

The method of example 1 was used, this time modifying the monomer proportions in the mixture as follows:

| | |
|---|---|
| methacrylic acid | 138 g |
| butyl methacrylate | 416 g |
| dodecane thiol | 40 g |
| azo-bis-isobutyronitrile | 4.7 g |

The solvent mixture was adjusted to give 50% dry content.

The polymer obtained had an acid number of 145 g KOH per gram and $\overline{Mn}$ in the order of 4 000.

The film obtained from a solution prepared according to the method of example 1 was harder than that from example 1 with a slightly reduced water resistance.

EXAMPLE 4

Terpolymer based composition

The method of example 1 was again used, this time modifying the monomer mixture composition as follows:

| | |
|---|---|
| methacrylic acid | 81 g |
| butyl methacrylate | 206 g |
| ethyl methacrylate | 206 g |
| dodecane thiol | 36.3 g |
| azo-bis-isobutyronitrile | 4.57 g |

The polymer obtained had an acid number of 98 mg KOH per gram and $\overline{Mn}$ in the order of 4 000.

The film obtained from a solution prepared according to example 1 was harder and slightly less resistant to water than the film produced in example 1.

EXAMPLE 5

Terpolymer based composition (preferred embodiment)

a) Polymer synthesis

A triple-necked flask was provided with a stirrer, thermometer, feed funnel, nitrogen source and coolant.

634.5 g of the butyl ether of monoethylene glycol was introduced into the flask as solvent.

The solvent was brought to 80° C. under agitation. The following homogeneous mixture was introduced into the feed funnel:

| | |
|---|---|
| methacrylic acid | 53.3 g |
| butyl methacrylate | 269 g |
| lauryl methacrylate | 15.2 g |
| dodecane thiol | 24.9 g |
| azo-bis-isobutyronitrile | 3.1 g |

The last two components act in known manner as reaction initiator and accelerator.

This mixture was slowly fed into the triple-necked flask (over a period of 40 to 60 min) keeping the reaction temperature at 83° C. After addition was complete the reaction medium was held at 83° C. for 2½ hours.

The solution obtained contained 36% polymer whose acid number was about 95 mg KOH per gram. The number average molecular weight $\overline{Mn}$ was about 4 000.

b) Production of preparation 197 g of solution from the preceding stage was stirred together with 803 g of deionized water and about 30 g of morpholine.

A homogeneous solution was obtained having a pH of 9.3, 7% dry content a viscosity, measured using an AFNOR No. 2.5 cup viscometer, of about 35 seconds.

c) Application

Application was carried out under the same conditions as in example 1, it being understood however that it is also possible to apply the resultant composition to objects for protective treatment as the objects leave the galvanization bath, i.e. at a relatively high temperature.

EXAMPLE 6

Variation of acid monomer

The method of example 1 was used, modifying the monomer mixture composition as follows:

| | |
|---|---|
| acrylic acid | 66 g |
| butyl methacrylate | 416.6 g |
| dodecane thiol | 35.4 g |
| azo-bis-isobutyronitrile | 4.46 g |

The polymer obtained had an acid number of 95 mg KOH per gram and an $\overline{Mn}$ in the order of 4 000.

The film obtained from a solution prepared in accordance with the method of example 1 was softer and less weather resistant than that produced in example 1.

EXAMPLE 7

Variation of ester monomer

The method of example 1 was used, modifying the monomer mixture composition as follows:

| | |
|---|---|
| methacrylic acid | 77.9 g |
| n-butyl acrylate | 416.6 g |
| dodecane thiol | 36.3 g |
| azo-bis-isobutyronitrile | 4.57 g |

The polymer obtained had an acid number of 95 mg KOH per gram and an $\overline{Mn}$ in the order of 4 000.

The film obtained from a solution prepared in accordance with the method of example 1 was sticky with a weather resistance lower than that of the film produced in example 1.

EXAMPLE 9

Temporary protection and removal of film

A zinc object was coated with the polymer of example 1. After three months' storage the film was removed in about two minutes by means of an alkaline detergent solution having the following composition:

| | |
|---|---|
| EDTA, tetrasodium salt | 0.2 |
| nonyl phenol polyoxyethylene (10 OE) | 0.5 |
| triethanolamine | 2 |
| glycol ether | 1 |
| water qsq | 100 g |

EXAMPLE 10

Preparation of colored film

A colored film was obtained by introducing 1% of the dye blue Irganol into the solution of example 1.

EXAMPLE 11

Preparation of opaque film

An opaque film was obtained by introducing 5% powdered titanium oxide into the concentrated polymer solution of example 1.

There is claimed:

1. A process for preparing a solution for the surface treatment of zinc, comprising:
   (a) forming a preparation comprising a copolymer, by polymerizing, in a mixture of organic cosolvents, at least one first monomer selected from the group consisting of acrylic acid and methacrylic acid, and at least one second monomer selected from the group consisting of acrylates and methacrylates; and
   (b) subsequent to polymerizing said at least one first monomer and said at least one second monomer, diluting said preparation with an aqueous medium.

2. The process according to claim 1, wherein said aqueous medium comprises an excess of said aqueous medium with respect to said mixture of organic cosolvents.

3. The process according to claim 1, wherein said aqueous medium consists of water.

4. The process according to claim 1, wherein said aqueous medium comprises a solution of water and an amino compound.

5. The process according to claim 4, wherein said amino compound is selected from the group consisting of ammonia and morpholine.

6. The process according to claim 1, wherein said at least one second monomer is selected from the group consisting of $C_{1-22}$ alkyl acrylates and $C_{1-22}$ alkyl methacrylates.

7. The process according to claim 1, wherein said at least one first monomer and said at least one second monomer consist of two different monomers.

8. The process according to claim 1, wherein said at least one first monomer and said at least one second monomer consist of three different monomers, whereby said resulting copolymer comprises a terpolymer.

9. The process according to claim 8, wherein at least one of said at least one second monomer is selected from the group consisting of lauryl acrylate and lauryl methacrylate.

10. The process according to claim 8, wherein said at least one second monomer consists of two different monomers.

11. The process according to claim 10, wherein said at least one first monomer is one monomer selected from the group consisting of acrylic acid and methacrylic acid, one of said at least one second monomer is selected from the group consisting of butyl acrylate and butyl methacrylate, and the other of said at least one second monomer is selected from the group consisting of lauryl acrylate and lauryl methacrylate.

12. The process according to claim 11, wherein said at least one first monomer consists of methacrylic acid, one of said at least one second monomer consists of butyl methacrylate, and the other of said at least one second monomer consists of lauryl methacrylate.

13. The process according to claim 1, wherein the resulting solution comprises 1 to 50 g. of solids per 100 g of solution.

14. The process according to claim 1, wherein the resulting copolymer has an acid number of 50 to 150 mg. KOH per gram of polymer.

15. The process according to claim 14, wherein the resulting copolymer has an acid number of 90 to 120 mg. KOH per gram of polymer.

16. The process according to claim 1, wherein the resulting copolymer has a number average molecular weight of between 2,000 and 20,000.

17. The process according to claim 16, wherein the resulting copolymer has a number average molecular weight of between 3,000 and 5,000.

18. A solution for the surface protection of zinc against white rust, comprising:
(a) a copolymer comprising at least one first monomer selected from the group consisting of acrylic acid and methacrylic acid, and at least one second monomer selected from the group consisting of acrylates and methacrylates;
(b) a mixture of organic cosolvents; and
(c) an aqueous medium.

19. The solution according to claim 18, wherein said aqueous medium comprises an excess of said aqueous medium with respect to said mixture of organic cosolvents.

20. The solution according to claim 18, wherein said aqueous medium comprises a solution of water and an amino compound.

21. The solution according to claim 18, wherein said copolymer consists of two different monomers.

22. The solution according to claim 18, wherein said copolymer comprises a terpolymer.

23. The solution according to claim 22, wherein said terpolymer comprises at least one second monomer selected from the group consisting of lauryl acrylate and lauryl methacrylate.

24. The solution according to claim 22, wherein said at least one second monomer consists of two different monomers.

25. The solution according to claim 24, wherein said terpolymer comprises at least one first monomer selected from the group consisting of acrylic acid and methacrylic acid, at least one second monomer selected from the group consisting of butyl acrylate and butyl methacrylate, and at least one second monomer selected from the group consisting of lauryl acrylate and lauryl methacrylate.

26. The solution according to claim 25, wherein said terpolymer comprises methacrylic acid, butyl methacrylate, and lauryl methacrylate.

* * * * *